United States Patent
Campbell et al.

(10) Patent No.: US 6,895,817 B2
(45) Date of Patent: May 24, 2005

(54) DUAL BRIDGE ANGULAR ACCELEROMETER

(75) Inventors: Ray F. Campbell, Newport Beach, CA (US); Thomas J. Gunther, Pasadena, CA (US); Joan D. Wada, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/604,232

(22) Filed: Jul. 2, 2003

(65) Prior Publication Data

US 2005/0000284 A1 Jan. 6, 2005

(51) Int. Cl.[7] .............................................. G01P 15/08
(52) U.S. Cl. ..................... 73/510; 73/514.02; 318/649; 244/3.2
(58) Field of Search ............................. 73/510, 514.02, 73/514.32; 318/649; 244/3.2; 701/3

(56) References Cited

U.S. PATENT DOCUMENTS 4,601,206 A * 7/1986 Watson ......................... 73/510
5,124,938 A * 6/1992 Algrain ....................... 318/649
5,383,363 A * 1/1995 Kulmaczewski ............. 73/510
6,776,043 B1 * 8/2004 Campbell et al. ........ 73/514.32

* cited by examiner

Primary Examiner—John E. Chapman
(74) Attorney, Agent, or Firm—Artz & Artz, PC

(57) ABSTRACT

An accelerometer includes an inertial platform maintaining an attitude in response to a platform stabilizing controller signal and defining a spin axis and a reference plane. An accelerometer, coupled to the inertial platform a distance from the spin axis, defines a flex axis, which is perpendicular to the stability axis. The accelerometer generates an accelerometer signal in response to acceleration of the accelerometer. A second accelerometer defines a second flex axis also perpendicular to the stability axis, and is also coupled to the inertial platform a distance from the spin axis. The second accelerometer generates a second accelerometer signal in response to acceleration of the second accelerometer. A controller, including an angular acceleration signal generator, receives the first accelerometer signal and the second accelerometer signal and generates an angular acceleration signal from a difference in amplitudes between the first accelerometer signal and the second accelerometer signal. The controller further generates the platform stabilizing controller signal in response to the first acceleration signal and the second acceleration signal.

16 Claims, 7 Drawing Sheets

DUAL BRIDGE ANGULAR ACCELEROMETER

CROSS REFERENCE TO RELATED APPLICATIONS

The present invention is related to application Ser. No. 10/604,232 entitled "Dual Bridge Angular and Linear Accelerometer," filed on Jul. 2, 2003 and incorporated by reference herein.

BACKGROUND OF INVENTION

The present invention relates generally to accelerometers, and more particularly, to a variable capacitance accelerometer generating angular signals.

It is well known that capacitive accelerometers measure the acceleration, vibration and the inclination of objects to which they are attached. These objects typically include missiles, spacecraft, airplanes and automobiles.

In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

This type of accelerometer can be used in an aerospace or in a portion of aircraft or spacecraft navigation or guidance systems. Accordingly, the temperature in the operating environment of the accelerometer changes over a wide range. Consequently, acceleration must be measured with a high accuracy over a wide range of temperatures and temperature gradients. This is often a difficult and inefficient process.

Additionally, missile systems require a high degree of accuracy regarding angular and linear acceleration measurements. Improvements in this regard are constantly being sought out.

The disadvantages associated with current accelerometer systems have made it apparent that a new accelerometer is needed. The new accelerometer should substantially minimize temperature sensing requirements and should also improve acceleration detection accuracy. The present invention is directed to these ends.

SUMMARY OF INVENTION

In accordance with one aspect of the present invention, an accelerometer system includes an inertial platform maintaining an attitude in response to a platform stabilizing controller signal and defining a spin axis and a reference plane. An accelerometer, coupled to the inertial platform a distance from the spin axis, defines a flex axis, which is perpendicular to the stability axis. The accelerometer generates an accelerometer signal in response to acceleration of the accelerometer. A second accelerometer defines a second flex axis also perpendicular to the stability axis, and is also coupled to the inertial platform a distance from the spin axis. The second accelerometer generates a second accelerometer signal in response to acceleration of the second accelerometer. A controller, including an angular acceleration signal generator, receives the first accelerometer signal and the second accelerometer signal and generates an angular acceleration signal from a difference in amplitudes between the first accelerometer signal and the second accelerometer signal. The controller further generates the platform stabilizing controller signal in response to the first acceleration signal and the second acceleration signal.

In accordance with another aspect of the present invention, a method for operating a dual bridge accelerometer system defining a z spin axis includes generating a first accelerometer signal from a first bridge accelerometer and generating a second accelerometer signal from a second bridge accelerometer. The first bridge accelerometer and the second accelerometer are controlled such that they remain in the xz-plane. A first output word is generated from the first bridge accelerometer equivalent to a sum of a first linear acceleration and a first tangential acceleration acting on the first bridge accelerometer. A second output word is generated from the second bridge accelerometer equivalent to a sum of the first linear acceleration and the first tangential acceleration acting on the second bridge accelerometer. The first output word is averaged with the negative of the second output word, and an angular acceleration signal is generated.

One advantage of the present invention is that it generates a dynamic range and granularity sufficient for Inter-Continental Ballistic Missile (ICBM) usage. Moreover, the bridge accelerometer consumes less power than current accelerometers, while dramatically improving reliability.

The dual bridge angular or linear accelerometer, or dual bridge accelerometer, generates reliable angular or linear acceleration measurements. These measurements are accurate to the degree required by missile systems and will therefore provide a dramatic improvement in reliability and manufacturing costs.

Another advantage is that it is not substantially affected by changes in temperature or temperature gradients. The bridge configuration reduces the temperature sensitivity, thereby enhancing the signal-to-noise ratio.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to an angular or linear accelerometer, particularly suited to the aerospace field. The present invention is, however, applicable to various other uses that may require accelerometers, such as any system requiring position and velocity measurements under extreme conditions, as will be understood by one skilled in the art.

Figure 1:
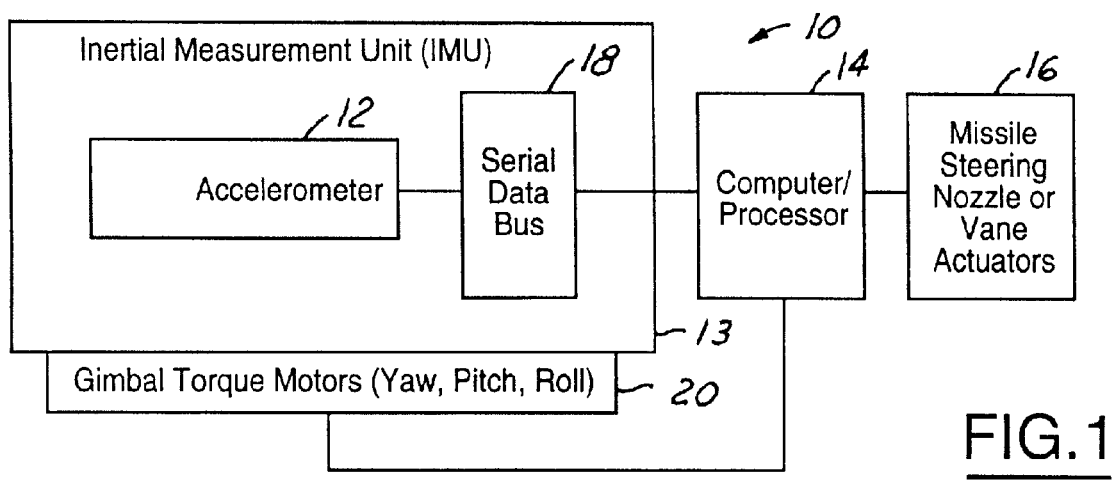
FIG. 1 illustrates an aerospace system including an accelerometer system in accordance with one embodiment of the present invention.

Referring to FIG. 1, the system 10, which is an aeronautical accelerometer system, including an angular or linear accelerometer 12 within an inertial measurement unit 13, is illustrated. The aerospace system 10 is merely an illustrative example of an accelerating object and not meant to be limiting. For example, the present angular accelerometer 12 could be implemented in any accelerating object to sense acceleration forces, including any type of vehicle or missile system, such as a Minuteman III missile system or a Scud missile system.

The illustrated aerospace system 10 includes an inertial measurement unit 13 including at least one angular or linear accelerometer 12 and a serial data bus 18. The system 10 further includes gimbal and torque motors 20, a computer/processor 14 (controller), and missile steering nozzle or vane actuators 16.

The angular or linear accelerometer 12 is coupled to the gimbals and gimbal torque motors 20 (yaw, pitch and roll motors). The accelerometer 12 is also coupled to the serial bus 18, which transfers information to the computer/processor 14. For multiple angular or linear accelerometers, the serial data bus 18 receives the accelerometer signals and sends them serially to the processor 14. The computer 14 is coupled to the missile steering nozzle (or vane actuators) unit 16 and the gimbal torque motors 20.

Figure 2:
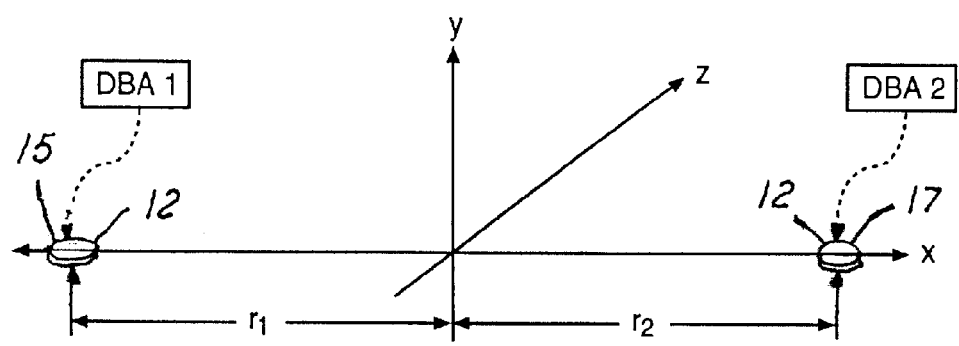
FIG. 2 illustrates a pictorial diagram of the angular or linear accelerometer system in accordance with FIG. 1.
Figure 3:
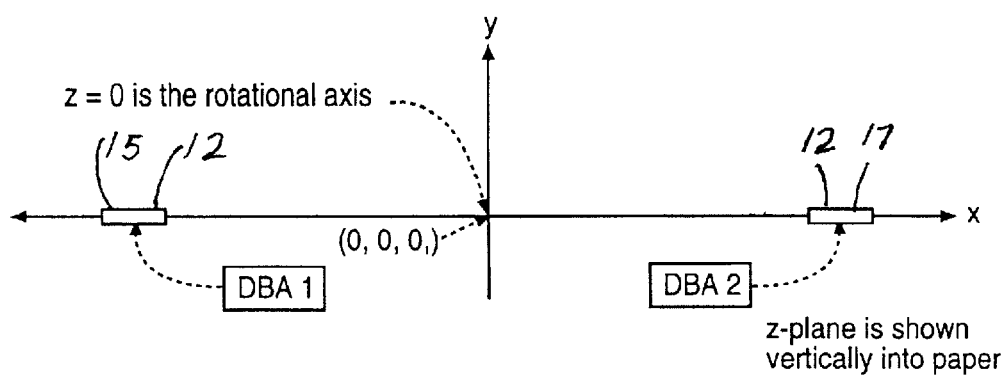
FIG. 3 illustrates a side view (x-y view) of FIG. 2.
Figure 4:
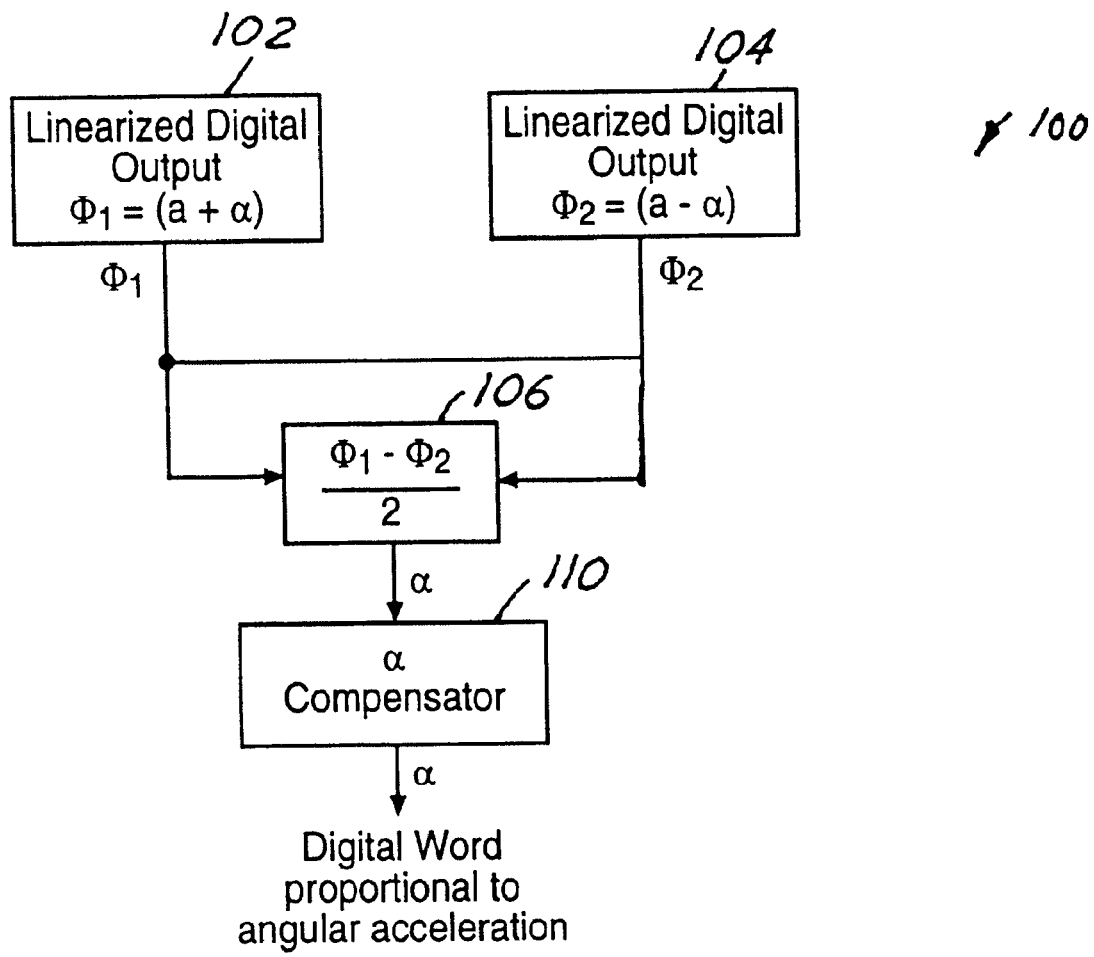
FIG. 4 illustrates a logic diagram of an accelerometer in accordance with another embodiment of the present invention.
Figure 5:
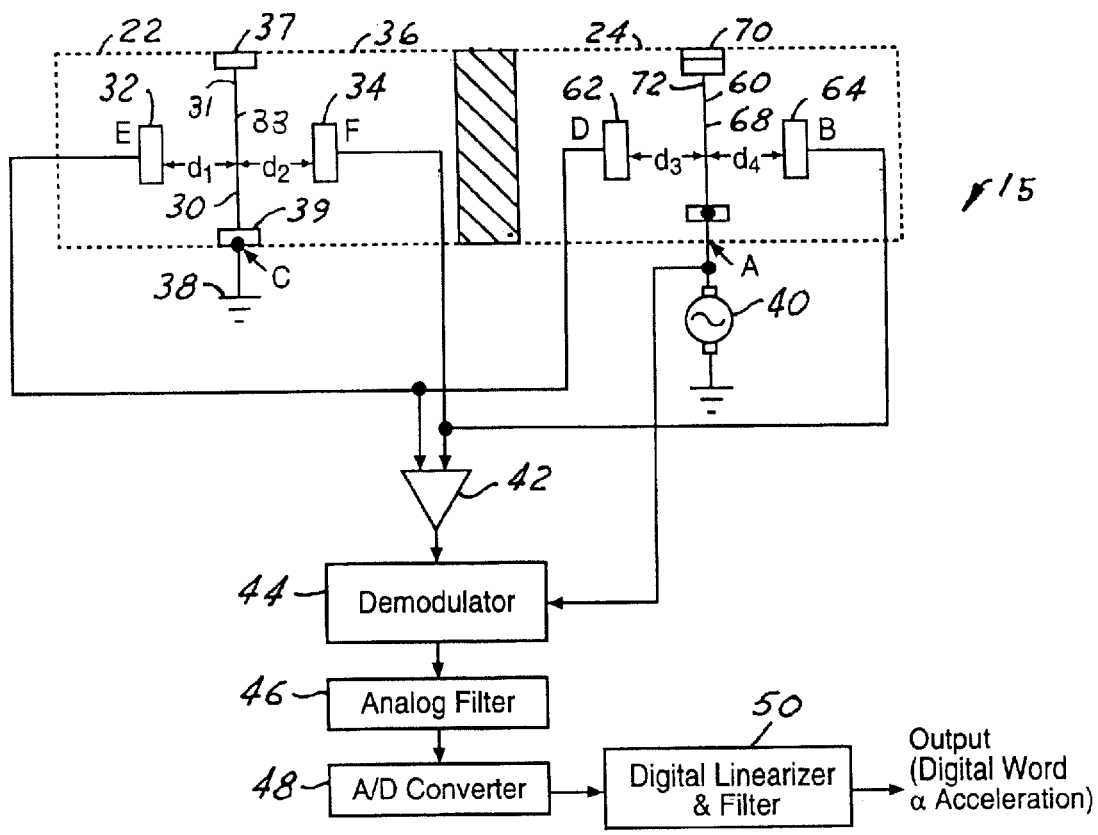
FIG. 5 illustrates an accelerometer from the accelerometer system of FIG. 1.

Referring to FIGS. 2 and 3, the angular or linear accelerometer 12 is illustrated. Two bridge accelerometers 15, 17, configured per FIGS. 4 and 5, are included to implement the angular or linear accelerometer 12.

The first bridge accelerometer 15 is positioned a distance $r_1$ from the central y-axis (stability axis) or the z spin axis, and the second bridge accelerometer 17 is positioned a distance $r_2$, from the central y-axis or the z spin axis. Both bridge accelerometers 15, 17 are represented as plates having axes along the flex axes of the bridge accelerometers 15, 17.

One embodiment of the present invention includes the faces of the plates in the xz-plane, perpendicular to the y-axis at distances $r_1$ and $r_2$ from the coordinate origin. Numerous other arrangements are also included herein, such as the faces of the plates in the yz or xz planes for alternate configurations.

For the present invention, $r_1=r_2$. This is merely one embodiment, and in fact, they may be both on either side of the origin, as long as they are separated by a known distance, and at a known distance from the origin.

The first and second bridge accelerometers 15, 17 are herein included on an inertial platform. The platform may be a gimbal 20 or alternate inertial platform design known in the art. The system 10 utilizes the generated signals from the accelerometers 15, 17 to control the platform position to maintain a near zero rotation.

Referring to FIG. 4, a block diagram 100 of signal generation logic, within the computer 14 for the linear and angular acceleration system 10, is illustrated.

In block 102, the distance, d of the flexured plates to the fixed plates, is proportional to the acceleration variable (as in the equation F=ma), which determines the bridge output voltage. As each accelerometer senses acceleration, either linear or angular-tangential, it deflects in response to the sum of the forces. Because the computer/processor 14 maintains the flexure plates in the xz-plane, the total acceleration acting on each bridge accelerometer 15, 17 is the sum of the linear acceleration and the tangential acceleration or linearized digital output. This is illustrated in block 102 as $(a+\alpha)$ for the first bridge accelerometer 15 and $(a-\alpha)$ in block 104 for the second bridge accelerometer 17. In other words, there are generated output words for the first bridge accelerometer 15 of $\phi_1=(a+\alpha)k$ and for the second bridge accelerometer 17 of $\phi_2=(a-\alpha)k$.

In block 106, which represents the angular acceleration signal generator, for equal distances of $r_1$ and $r_2$, $\phi_1=k_1a+k_2\alpha$ and $\phi_2=k_3ak_4\alpha$, and $k_1$ and $k_3$ are equal if $r_1=r_2$. Otherwise they may be calculated or modeled for the exact expression. In this simplified case, $\phi_1-\phi_2=(k_2\alpha)-(-k_4\alpha)$ and therefore $\alpha=k(\phi_1-\phi_2)/2$, where k is a constant to be determined at manufacture, e.g. k may be defined to depend on materials and size constraints. In other words, $\alpha$ is generated from the differences in amplitudes of the two accelerometer signals. Following generation thereof, $\alpha$ is scaled and compensated in the compensator block 110.

The circuitry illustrated in FIG. 4 applies the sum and differences of amplitudes from block 106 to a compensation circuit in the compensator block 110, which may be a lookup table, for providing compensation for the nonlinearities induced by the particular mechanical misalignment, manufacturing and other data path anomalies.

One output ($\alpha$) is a digital word proportional to the rotational (angular) acceleration in either direction about the z-axis. An alternate output may be (a) a digital word proportional to the linear acceleration in either direction along the y (not illustrated).

Figure 6:
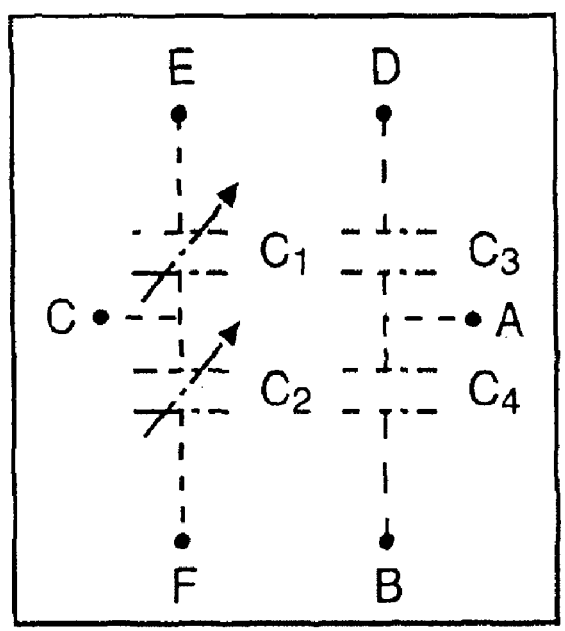
FIG. 6 illustrates the equivalent circuit for the capacitors of FIG. 5.

Referring to FIGS. 5 and 6, a bridge accelerometer in accordance with FIGS. 1, 2 and 3 is illustrated. Each bridge accelerometer 15 or variable capacitance bridge accelerometer (VCBA) within the angular or linear accelerometer 12 is a single axis accelerometer that generates a robust wide dynamic range of performance. Important to note is that alternate embodiments of the present invention have one or more accelerometers, the two illustrated accelerometers 15, 17 are only one example of a possible arrangement of accelerometers, and any number of accelerometers can be utilized.

The accelerometer 15 will be described as an illustrative example of the two accelerometers 15, 17 in this embodiment. The accelerometer 15 is part of the inertial measurement unit 13 and includes a housing 36, a flexured plate section 22, a rigid plate section 24, a ground 38, an AC source 40, a differential amplifier 42, a demodulator 44, an analog filter 46, an analog-to-digital converter 48, and a digital linearizer and filter 50.

The housing 36 or metal housing structure encloses four capacitors, which will be discussed later. A gas or vacuum environment is also enclosed therein such that there is no interference with the movement of the flexure plate 30 other than the acceleration of the system 10 along a perpendicular axis.

The flexured plate section 22 includes a single flexure plate 30 and two parallel fixed plates 32, 34. The rigid plate section 24 includes a rigid plate and two fixed plates. The two sections are electrically isolated and enclosed in a metal housing structure 36.

In the present embodiment, the flexure plate 30 is coupled to the housing 36 at only one edge 37 or 39. Numerous other attachment points are, however, included, as will be understood by one skilled in the art. The flexure plate includes a first side 31, a second side 33 and a common edge 37.

The flexure plate 30 is positioned between the first and second fixed plates 32, 34 such that the first fixed plate 32 is a first distance ($d_1$) from the first side 31 and the second fixed plate 34 is a second distance ($d_2$) from the second side 33 of the flexure plate 30. The flexure plate 30 is affixed to the metal housing structure 36 through at least a portion of the common edge 37 of the flexure plate 30, which is also coupled to a ground 38.

The flexure plate is rigidly fixed to the metal housing structure 36 through almost any manner known in the art. Resultantly, all the system flexure is generated within the flexure plate 30 along a flex axis (for the first accelerometer 15 this is a first flex axis, for the second accelerometer 17, this is the second flex axis). This generally increases reliability and robustness of the system 10. This, however, generates a non-linear output from the flexure plate 30, which will be discussed regarding the linearizer 50.

The combination of the first fixed plate 32 and the flexure plate 30 forms a first parallel plate capacitor, and the combination of the second fixed plate 34 and the flexure plate 30 forms the second parallel plate capacitor. The equivalent capacitor for the first parallel plate capacitor is illustrated in FIG. 6 in broken lines as $C_1$, and the equivalent capacitor for the second parallel plate capacitor is illustrated in broken lines as $C_2$.

The capacitance of the parallel plate capacitors is determined by the following:

$$C \cong (\epsilon_0 A)/d,$$

where $\epsilon_0$ is the permittivity constant, A is the area of a fixed plate 32 or 34, and d is the effective distance between the flexure plate 30 and one of the fixed plates 32, 34.

The first fixed plate 32 is coupled to the metal housing structure 36 and positioned a first distance ($d_1$) from the flexure plate 30. The first fixed plate 32 and the flexure plate 30 form a first capacitor whose operation is also governed by the equation $$C \cong (\epsilon_0 A)/d.$$

The first fixed plate 32 responds to movement of the flexure plate 30 when $d_1$ either increases or decreases, thereby generating a first phase shift capacitance signal.

The second fixed plate 34 is also coupled to the metal housing structure 36 and positioned a second distance ($d_2$) from the flexure plate 30. The second fixed plate 34 and the flexure plate 30 form a second capacitor whose operation is governed by the equation $$C \cong (\epsilon_0 A)/d.$$

The second fixed plate 34 responds to movement of the flexure plate 30 when $d_2$ either increases or decreases, thereby generating a second phase shift capacitance signal.

The distances ($d_1$ and $d_2$) between the flexure plate 30 and the fixed plates 32, 34 are a function of acceleration and are proportional or equal when the system 10 is at rest. During acceleration, the flexure plate 30 flexes according to the reaction force of Newton's second law of motion,
force=mass×acceleration (F=ma), causing the distance between the flexure plate 30 and the fixed plates 32, 34 to vary, thus creating the two variable capacitors $C_1$, $C_2$, one on each side of the flexure plate 30.

For the rigid plate section 24, which is insulated from the flexured plate section 22, the rigid plate 60 is positioned between the third fixed plate 62 and fourth fixed plate 64 such that the third fixed plate 62 is a third distance ($d_3$) from a first side 66 and the fourth fixed plate 64 is a fourth distance ($d_4$) from a second side 68 of the rigid plate 60. The rigid plate 60 is coupled to an insulator 70 through at least a portion of at least one common edge 72 of the first side 66 and the second side 68 of the rigid plate 60, and the insulator 70 is affixed to the metal housing structure 36. The third and fourth fixed plates 62, 64 are coupled to the housing 36.

In the present embodiment, the rigid plate 60 is coupled to the housing 36 through an insulator 70 at only one edge 72. However, numerous other attachment points are included, as will be understood by one skilled in the art.

The combination of the third fixed plate 62 and the rigid plate 60 forms a third parallel plate capacitor, and the combination of the fourth fixed plate 64 and the rigid plate 60 forms the fourth parallel plate capacitor. The equivalent capacitor for the third parallel plate capacitor is illustrated in broken lines in FIG. 6 as $C_3$, and the equivalent capacitor for the forth parallel plate capacitor is illustrated in broken lines as $C_4$.

The first and second capacitors are formed on each side of the flexure plate 30 and the third and fourth capacitors are formed on either side of the rigid plate 60. The four capacitors are electrically connected to form a bridge. The fixed capacitors (third and fourth) and rigid plate 60 are isolated from the flexured plate 30 and flexured plate capacitors (first and second). All capacitors are designed to be as nearly equal as possible when at rest.

The distance between the flexure plate 30 and the rigid plate 60 is a function of acceleration. The center of each bridge side (ED and BF in FIGS. 5 and 6) is monitored to detect the differential amplitude. As the flexure plate 30 flexes in response to acceleration, one capacitor increases and the other decreases, thereby increasing the bridge voltage on one side and decreasing bridge voltage on the other.

The bridge is excited with an AC source 40 at one end and grounded at the other. The ground 38 is coupled to the flexure plate 30 and the AC source 40 is coupled to the rigid plate 60. The two capacitive legs (C3, C1) and (C4, C2) of the bridge produce two voltage dividers, each of which provides a terminal (ED, FB), illustrated in FIG. 6, to measure the resulting voltage.

The bridge configuration reduces the temperature sensitivity and the AC excitation allowing narrow band analog filtering, both of which enhance the signal-to-noise ratio. The bridge circuitry utilizes GaAs or high speed CMOS, as the accuracy required for performance will require low propagation delays. In one embodiment, the bridge circuitry is mounted on a heated housing structure. In addition, the entire system includes a precision heating device (not shown) and sufficient mass to reduce gradients in the bridge in one embodiment.

The voltage phase gives direct indication of the direction of acceleration. This output is gain adjusted if required in the differential amplifier 42, and received in the demodulator 44, which rectifies the waveform as a function of the reference excitation phase from the AC source 40. The resulting waveform is then filtered in the analog domain in the analog filter 46 and received in an analog-to-digital converter 48 where the data becomes a digital word.

The digital word is then filtered and linearized in the digital linearizer and filter 50 for manufacturing and flexure non-uniformities. This output is a digital word having a magnitude proportional to the acceleration of the system in either direction along the perpendicular axis.

In other words, the linearizer 50 receives the overall digital word signal. The linearizer 50 compensates for both the nonlinear function generated from the analog-to-digital converter 48 and any manufacturing anomalies, as will be understood by one skilled in the art. The linearizer 50 value is established in manufacturing through taking large samples of performance curves, as will be understood by one skilled in the art. The linearizer 50 output is a digital word whose magnitude is proportional to the acceleration of the system 10 in either direction along an axis perpendicular to the flexure plate 30.

Numerous alternate linearizers are also included in the present embodiment whereby a substantially linear function can be generated by compensating for nonlinear functions, for example, in the digital domain, a digital linearizer is included. The output of the linearizer 50 is an acceleration signal multiplied by a constant (k).

Statistical filtering of the linearized data somewhere significantly above the maximum flexure frequency also occurs in either the digital linearizer and filter 50 or the computer 14 to reduce the overall noise impact on the system 10. The compensation for the non-linearity of the flexure structure and overall transport error is compensated for by the linearizer and filter 50 whose values are established in manufacturing through sampling performance curves.

The computer 14 receives the acceleration signal multiplied by the constant and generates a computer signal and response thereto. The computer 14 is embodied as a typical missile or airplane computer, as is familiar in the art.

The missile steering nozzle or vane actuators 16 receive the computer signal and activate the gimbal torque motors 20 or object control devices in response thereto.

A functional angular accelerometer consists of a pair of Differential Bridge Accelerometers (DBA), each of which is configured as shown in FIG. 5. Each DBA is a single axis accelerometer that can provide a reliable wide dynamic range of performance.

Figure 7:
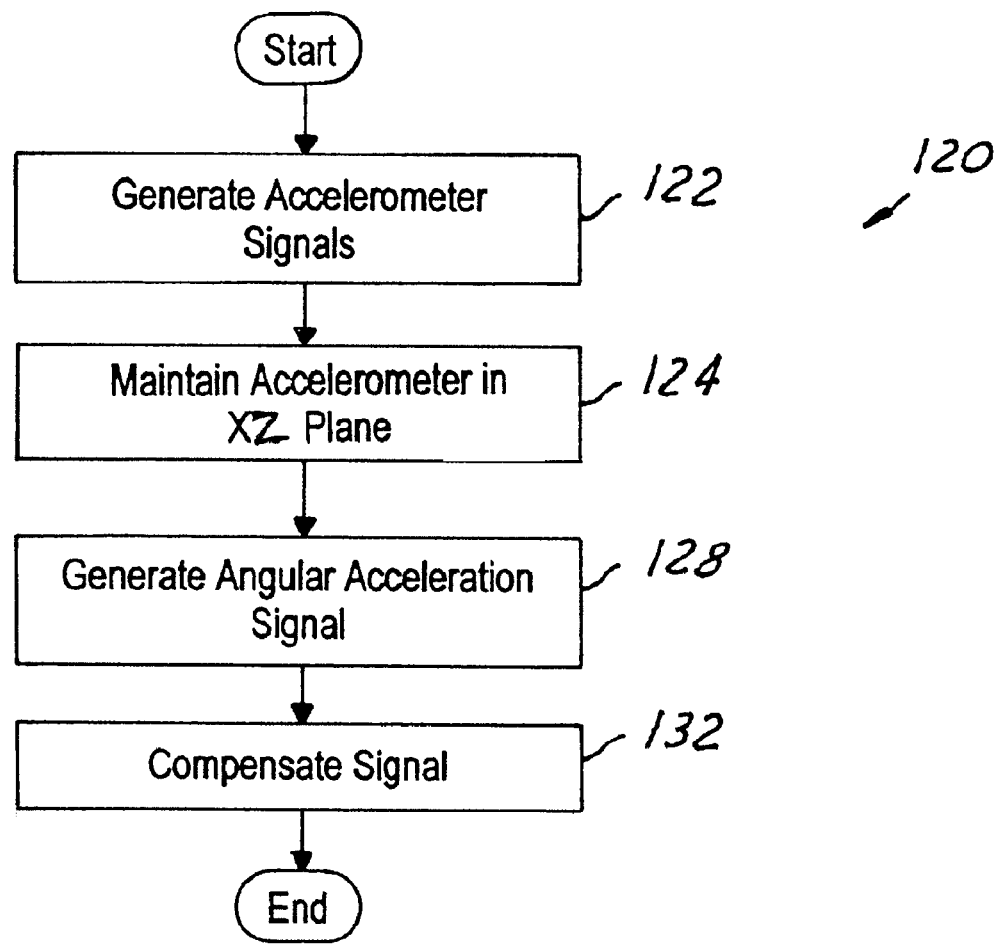
FIG. 7 illustrates a logic flow diagram of the aerospace system of FIG. 1 in operation, in accordance with another embodiment of the present invention.

Referring to FIG. 7, a logic flow diagram 120 illustrating a method for generating angular or linear acceleration signals is illustrated. Logic starts in operation block 122 where the platform is moved or accelerated and the two accelerometers 15, 17 generate accelerometer signals i.e. linearized digital output signals.

In operation block 124, the computer 14 maintains the accelerometers 15, 17 in the xz-plane either in response to the accelerometer signals or the angular or linear signals generated by the system 10.

In operation block 128, the total of first accelerometer signal minus the second accelerometer signal is divided in half to generate the angular acceleration output word.

In operation block 132, the angular acceleration word is compensated in the compensator 106.

In operation, a method for operating a dual bridge accelerometer system defining a z spin axis includes generating a first accelerometer signal from a first bridge accelerometer and generating a second accelerometer signal from a second bridge accelerometer. The first bridge accelerometer and the second accelerometer are controlled such that they remain in the xz-plane. A first output word is generated from the first bridge accelerometer equivalent to a sum of a first linear acceleration and a first tangential acceleration acting on the first bridge accelerometer. A second output word is generated from the second bridge accelerometer equivalent to a sum of the first linear acceleration and the first tangential acceleration acting on the second bridge accelerometer. The first output word is averaged with a negative of the second output word, and an angular acceleration signal is generated.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. An accelerometer system comprising:
   an inertial platform defining a reference plane, a spin axis, and a stability axis, wherein said spin axis is within said reference plane and said stability axis is perpendicular to said reference plane, said inertial platform maintaining a minimized rotation in response to a platform stabilizing controller signal;
   a first accelerometer defining a first flex axis perpendicular to said stability axis, said first accelerometer coupled to said inertial platform a first distance from said spin axis, said first accelerometer generating a first accelerometer signal in response to acceleration of said first accelerometer;
   a second accelerometer defining a second flex axis perpendicular to said stability axis, said second accelerometer coupled to said inertial platform a second distance from said spin axis, said second accelerometer generating a second accelerometer signal in response to acceleration of said second accelerometer; and
   a controller comprising an angular acceleration signal generator, said controller receiving said first accelerometer signal and said second accelerometer signal, said angular acceleration signal generator generating an angular acceleration signal from a difference in amplitudes of said first accelerometer signal and said second accelerometer signal, said controller further generating said platform stabilizing controller signal in response to said first acceleration signal and said second acceleration signal.

2. The system of claim 1 wherein said first accelerometer generates a first linearized digital output signal in response to acceleration of said first accelerometer, and
   said second accelerometer generates a second linearized digital output signal in response to acceleration of said second accelerometer.

3. The system of claim 1, wherein said controller comprises a first compensator compensating for a non-linearity within said angular acceleration signal and generating a first digital word proportional to an angular acceleration about said spin axis.

4. The system of claim 3 wherein said controller controls a missile system in response to said first digital word.

5. The system of claim 1, wherein said first accelerometer is a first bridge accelerometer and said second accelerometer is a second bridge accelerometer.

6. The system of claim 1, wherein said first accelerometer and said second accelerometer are equidistant from said spin axis.

7. The system of claim 1, wherein said inertial platform comprises a gimbal or plurality of gimbals.

8. A method for operating a dual bridge accelerometer system defining a z spin axis comprising:
   generating a first accelerometer signal from a first bridge accelerometer;
   generating a second accelerometer signal from a second bridge accelerometer;
   controlling said first bridge accelerometer and said second accelerometer such that said first bridge accelerometer and said second bridge accelerometer remain in an xz-plane;
   generating a first output word from said first bridge accelerometer equivalent to a sum of a first linear acceleration and a first tangential acceleration acting on said first bridge accelerometer;
   generating a second output word from said second bridge accelerometer equivalent to a sum of said first linear acceleration and said first tangential acceleration acting on said second bridge accelerometer;
   averaging said first output word and a negative value of said second output word; and
   generating an angular acceleration signal.

9. The method of claim 8 further comprising compensating for non-linearities within said angular acceleration signal.

10. The method of claim 8 further comprising generating a digital word proportional to an angular acceleration around said spin axis.

11. The method of claim 10 further comprising activating an object control device in response to said digital word.

12. The method of claim 8 averaging said first output word and a negative value of said second output word further comprises generating a difference of amplitudes of said first output word and said second output word.

13. An accelerometer system comprising:
   an inertial platform defining a reference plane, a spin axis, and a stability axis, wherein said spin axis is within said reference plane and said stability axis is perpendicular to said reference plane, said inertial platform maintaining a minimized rotation in response to a platform stabilizing controller signal;
   a first bridge accelerometer defining a first flex axis perpendicular to said stability axis, said first accelerometer coupled to said inertial platform a first distance from said spin axis, said first accelerometer generating a first linearized digital output signal in response to acceleration of said first accelerometer;
   a second bridge accelerometer defining a second flex axis perpendicular to said stability axis, said second bridge accelerometer coupled to said inertial platform a second distance from said spin axis, said second bridge accelerometer generating a second linearized digital output signal in response to acceleration of said second bridge accelerometer; and
   a controller comprising a first compensator, said controller receiving said first linearized digital output signal and said second linearized digital output signal,
   said controller generating an angular acceleration signal from a difference in amplitudes of said first linearized digital output signal and said second linearized digital output signal,
   said first compensator compensating for a non-linearity within said angular acceleration signal and generating a first digital word proportional to a rotational acceleration about said spin axis,
   said controller further generating said platform stabilizing controller signal in response to said first linearized digital output signal and said second linearized digital output signal, and
   said controller controlling a missile system in response to said first digital word.

14. The system of claim 13, wherein said controller is a missile computer.

15. The system of claim 13, wherein said first compensator is a linear lookup table providing compensation information to said controller.

16. The system of claim 13, wherein said first bridge accelerometer and said second bridge accelerometer are equidistant from said spin axis.

* * * * *